(12) United States Patent
Forster (10) Patent No.: US 6,914,562 B2
(45) Date of Patent: Jul. 5, 2005

(54) RFID TAG USING A SURFACE INSENSITIVE ANTENNA STRUCTURE

(75) Inventor: Ian J. Forster, Chelmsford (GB)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 10/410,252

(22) Filed: Apr. 10, 2003

(65) Prior Publication Data

US 2004/0201522 A1 Oct. 14, 2004

(51) Int. Cl.[7] .................................................. H01Q 1/38
(52) U.S. Cl. ............................. 343/700 MS; 343/895; 340/572.7
(58) Field of Search ................... 343/700 MS, 702, 343/795, 846, 848; 235/492; 340/572.7, 572.1

(56) References Cited

U.S. PATENT DOCUMENTS

| 5,430,441 A | 7/1995 | Bickley et al. ........ 340/825.54 |
| 5,557,279 A | 9/1996 | D'Hont ...................... 342/42 |
| 5,563,616 A | * 10/1996 | Dempsey et al. ........... 343/753 |

(Continued)

FOREIGN PATENT DOCUMENTS

| DE | 197 03 864.6 | 6/1998 |
| DE | 101 36 502 | 2/2003 |
| WO | 02/29929 | 2/2000 |
| WO | 00/43952 | 7/2000 |
| WO | 01/79988 | 10/2001 |
| WO | 01/80174 | 10/2001 |
| WO | 02/097723 | 12/2002 |
| WO | 03/009007 | 1/2003 |
| WO | 2004/025554 | 3/2004 |
| WO | 2004/036689 | 4/2004 |
| WO | 2004/046762 | 6/2004 |

*Primary Examiner*—Tan Ho
(74) *Attorney, Agent, or Firm*—Renner, Otto, Boisselle & Sklar, LLP (57) ABSTRACT

An antenna system that is insensitive to the surface on which it is mounted for use with a RFID tag having a wireless communication device, including a plurality of conductive tabs coupled to the wireless communication device for receiving and radiating radio frequency energy. At least two of the tabs are substantially identical in shape and coupled to the wireless communication device at feedpoint differing in location on each of the two tabs wherein the width of said at least two of said plurality of tabs taken transverse to the longitudinal centerline axis of each tab varies with distance along the longitudinal centerline axis of each of said tabs from its feedpoint. Alternatively, the wireless communication device is coupled to the tab at a feedpoint selected at a location differing on each of the tabs where the conducting area per unit length of the longitudinal centerline axis of each tab varies with distance along the longitudinal centerline axis of each of said tabs from its feedpoint. A radio frequency reflecting structure is coupled to the conductive tabs for reflecting radio frequency energy radiated therefrom. A dielectric material is located intermediate the conductive tabs and the radio frequency reflecting means.

89 Claims, 3 Drawing Sheets

U.S. PATENT DOCUMENTS

| | | | |
|---|---|---|---|
| 5,793,305 A | 8/1998 | Cole et al. | 340/825.54 |
| 6,078,791 A | 6/2000 | Lake et al. | 455/90 |
| 6,133,836 A | 10/2000 | Smith | 340/572.7 |
| 6,147,606 A | 11/2000 | Duan | 340/572.7 |
| 6,215,402 B1 * | 4/2001 | Rao Kodukula et al. | 340/572.8 |
| 6,236,314 B1 | 5/2001 | Smith et al. | 340/572.7 |
| 6,259,369 B1 | 7/2001 | Monico | 340/572.8 |
| 6,265,977 B1 * | 7/2001 | Vega et al. | 340/572.7 |
| 6,278,369 B2 | 8/2001 | Smith et al. | 340/572.7 |
| 6,278,413 B1 | 8/2001 | Hugh et al. | 343/818 |
| 6,281,794 B1 * | 8/2001 | Duan et al. | 340/572.1 |
| 6,320,545 B1 | 11/2001 | Kawahata et al. | 343/700 MS |
| 6,339,385 B1 | 1/2002 | Tuttle | 343/825 |
| 6,342,866 B1 * | 1/2002 | Ho et al. | 343/795 |
| 6,501,435 B1 | 12/2002 | King et al. | 343/795 |
| 6,535,175 B2 | 3/2003 | Brady et al. | 343/795 |
| 6,665,193 B1 | 12/2003 | Chung et al. | 361/760 |
| 6,667,092 B1 | 12/2003 | Brollier et al. | 428/182 |
| 6,703,985 B2 * | 3/2004 | Lee | 343/786 |
| 2001/0043162 A1 | 11/2001 | Babb | |
| 2001/0053675 A1 | 12/2001 | Plettner | |
| 2001/0054755 A1 | 12/2001 | Kirkham | |
| 2002/0126057 A1 | 9/2002 | Forster et al. | |
| 2002/0175873 A1 | 11/2002 | Forster et al. | |
| 2004/0001029 A1 | 1/2004 | Parsche et al. | |
| 2004/0032377 A1 | 2/2004 | Forster et al. | |
| 2004/0075607 A1 | 4/2004 | Cathey | |

* cited by examiner

RFID TAG USING A SURFACE INSENSITIVE ANTENNA STRUCTURE

BACKGROUND OF THE INVENTION

Field of the Invention

This invention relates to the field of Radio Frequency Identification (RFID) tags and labels, and in particular to tags and labels that include a surface insensitive antenna structure. This application incorporates by reference U.S. Pat. No. 6,451,154 entitled "RFID Manufacturing Concepts," and U.S. patent application Ser. No. 10/323,490, entitled RFID LABEL AND METHOD OF MANUFACTURE.

Current inventory and manufacturing methods rely on the ability to track and identify items of concern, such as inventory items, packages, individual parts, etc., and to communicate information concerning such items of concern in a wireless manner for processing and use. One known method of tracking and providing information on such items of concern is to attach to such item a wireless communication device, such as an active or passive transponder, incorporated into an identification tag or label that responds to radio frequency interrogation and commands. The tag may store or represent information concerning the item to which it is attached, such as a unique identifying number, item status such as opened or unopened, location, and the like. The tag may be attached to an individual item or to packaging containing multiple items.

The present invention deals with the problems that arise in attempting to design and manufacture a RFID tag that has general applicability and can efficiently operate when the packaging and containers on which such a tag may be attached vary widely. For example, some items of interest are shipped in bulk in a single container made of cardboard or plastic, heavier items may be shipped in wooden boxes, and liquids and viscous materials may be shipped in metal containers. Specifically, the present invention is directed toward meeting the problems that arise in attempting to design and manufacture an antenna structure that will operate efficiently and properly over a wide range of such packaging and containers.

In general, an antenna connected to a RFID tag is designed for operation on a specific or narrow range of substrates on which it may be attached. Other substrates will cause the radiation efficiency of the antenna to deteriorate from the designed optimal mounting substrates. Thus, the antenna, and consequently tag, will no longer radiate properly as designed. This loss of antenna efficiency may be due to a number of variable packaging factors. One is that each substrate has its own dielectric characteristics that typically affect the impedance matching between the wireless communication device and its antenna. Impedance matching ensures the most efficient energy transfer between an antenna and the wireless communication device.

The substrates on which such antennas are attached therefore are important in designing the antenna and the subsequent operating efficiency of the RFID tag itself. Common substrates vary from the non-conductive, such as cardboard, to the conductive, such as foil. In fact, even within a single type of substrate the dielectric characteristics may vary, such as in cardboard packaging, the thickness of the cardboard substrate can differ from package to package, even the moisture content of the cardboard due to weather changes may cause a change in its dielectric characteristics. The radiation efficiency and operation of the antenna can be affected by these highly variable factors even if the antenna was designed for attachment to a cardboard substrate. Therefore, a need exists to provide an antenna for use with a wireless communication device in an RFID tag whose impedance and therefore radiation efficiency is substantially insensitive to the substrate on which it may be attached.

Some prior art systems attempt to overcome the problem of the varying dielectric characteristics of the packaging on which the tag is applied by mounting and encapsulating the wireless communication device and antenna system on a known substrate and then attaching the encapsulated system onto the subject packaging so that the RFID tag "floats" independently of the packaging on which it is mounted, i.e., it is separated from the package by some distance, such as label/ticket that is attached with a plastic fastener. The problem with this encapsulated RFID tag is that it is cumbersome, expensive, difficult to mount and protrudes from the surface of the packaging on which it is mounted, leaving it susceptible to damage and prone to fall off during handling of the packaging, leaving the item untagged.

To overcome these noted problems, RFID tag embodiments have been developed that are directly attached by adhesion to or printing on the surface of the packaging thereby resulting in a lower tag profile that is less prone to damage or removal during handling of the packaging. However, direct surface mounting of these antennas and tags cause their efficiency to suffer from the varying dielectric characteristics of the surfaces on which they are attached. Thus, these systems require that different tags be used on different packaging resulting in added cost, complexity and manufacturing inconvenience. Since it is preferable to tag each inventory item separately, the need for so many different tags multiples the problems greatly.

Other known prior art RFID tags have attempted to overcome the problem of the varying dielectric characteristics of the packaging and provide a generally, "one size fits all" tag, by designing tag antenna systems that are insensitive to the surfaces on which they are mounted.

One known such RFID tag structure that is insensitive to its mounting surface, is that found in U.S. Pat. No. 6,501,435 issued Dec. 31, 2002 to King et al. and titled Wireless Communication Device and Method which compensates for the varying substrate dielectric characteristics on which the RFID tabs are attached by utilizing an antenna structure where the radiating tabs are asymmetric with regard to their shape and size.

SUMMARY OF THE INVENTION

The present invention relates to an antenna system and a RFID tag or label that is insensitive to or compensates for the substrate on which it is mounted.

The RFID tag includes a wireless communication device, such as a passive or active transponder that responds to a radio frequency signal to communicate stored information concerning a package or its contents.

The antenna system contains two or more tabs constructed out of conductive material. The tabs may act as a monopole or multiple array antenna and may further act to attach the wireless communication device of the tag to the packaging or container. Likewise the tabs may resonate at one or multiple frequencies of interest. Apertures in the packaging may be used in conjunction with the tabs to form slot antennas or antennas that have multiple resonant frequencies.

The tabs may attach to, be printed on, or formed by the surface of the package. In one embodiment, the tab(s) are attached to the surface of a package, which itself comprises a dielectric material. An example of this embodiment is attachment of the tabs to a corrugated cardboard box. This embodiment offers the advantage of efficiency, by eliminating the need for an additional dielectric material beyond that of the package itself. A disadvantage of this embodiment is that variability of the packaging material, such as its structure and its dielectric constant (the dielectric constant is the amount of permissivity of a particular material). This variability in turn can lead to unacceptable variations in the impedance of the RFID device.

Therefore, it is preferred that the tab(s) be reactively coupled to the surface of the package through a dielectric material. The dielectric material can be an adhesive coated flexible label stock on which the tabs are mounted to attach the RFID device to a package. In the preferred embodiment of the invention, the label stock is a flexible material, such as a polymeric film, that is manufactured in long rolls of flexible web material using roll-to-roll manufacturing techniques. The uniform tab design of the preferred embodiment, as further explained herein, offers various manufacturing advantages in roll-to-roll manufacturing of label stock, such as simplifying the printing or other formation of the tabs; simplifying connection of the tabs to the microelectronic device; facilitating die cutting or other separation into individual labels or label inlays and other advantages as are apparent to those skilled in the art.

Methods for manufacturing RFID labels are disclosed in PCT Publication No. WO 01/61646 by Moore North America, Inc., incorporated herein by this reference. The method disclosed in PCT Publication No. WO 01/61646 uses a number of different sources of RFID inlets, each inlet including an antenna and a chip. A plurality of webs is matched together and RFID labels are die cut from the webs, to produce RFID labels with liner. Alternatively, linerless RFID labels are produced from a composite web with a release material on one face and pressure sensitive adhesive on the other, the labels formed by perforations in the web. Various alternatives are possible.

The tabs may be formed on the web using a wide variety of materials and processes. For example, one process involves printing on the web a conductive material, such as silver conductive ink, in a pattern defining multiple tabs. The ink may be printed for example using silk screening techniques, such as in a sheet fed or roll operation. The tabs are typically dried and stored on the web in a roll. However, as an alternative, the tabs may be wet printed during the label manufacturing process, in line with other process steps.

Additional suitable methods of forming the tabs include printing conductive ink, sputtering metal, laminating foil or hot-stamping, or any method known in the art for forming a conductive patterns on a film.

The precision or definition of the printed elements of lines and spaces is critical to the performance of the tabs and the overall RFID device. With some tab designs, conventional printing may not provide adequate resolution, line/space separation or other quality characteristics necessary to deliver engineered performance.

Likewise, control of thickness and smoothness of the printed areas of the tabs can have an important effect on their performance. Variability due to ink formulation, environmental conditions, substrate specifications, process conditions and other factors can impact both the smoothness and final thickness of printed antennas. Surface tension effects underlie many of these variables and place constraints on the amount of ink that can be deposited, and how closely graphic elements can be positioned to one another.

In addition to a flexible dielectric base material that carried the tabs, an additional continuous web or sheet of selected materials may be provided to support and protect the tabs and microelectronic device, and/or to provide usable form factors and surface properties (e.g. printability, adhesive anchorage, weatherability, etc.) for specific applications. The base material and additional protective material(s) may be made of films, papers, laminations of films and papers, or other flexible sheet materials suitable for a particular end use. The resulting continuous web of RFID label stock or RFID tag stock may be overprinted with text and/or graphics, die-cut into specific shapes and sizes into rolls of continuous labels, or sheets of single or multiple labels, or rolls or sheets of tags.

In typical label constructions, the label is die cut, as with a wedge die or other cutting method known in the label art. In the case of a pressure sensitive adhesive label carried on a liner layer, the die cut may extend all the way through the cross-section of the label or the cut may extend only down to the liner layer. In this instance, the liner may be kept as a unified sheet of standard sheet size, with one or more removable labels on top of the sheet, as is typical in the labeling art. It is noted that an adhesive layer and corresponding release liner may be omitted, in the event that a tag rather than a label is desired.

In one preferred embodiment, the label stock is a foam material as a foam material provides electrical as well as mechanical manufacturing advantages in providing a more efficient performance than some other materials such as cardboard, within relatively short, compact dimensions than would otherwise be required to produce the same results. The foam material also acts as a dielectric medium, as discussed further below, that makes for easier manufacturing and permits laminating flexibility and less cost than found with solid materials such as polypropelene which are fairly inflexible and costly in manufacturing and use.

Also, the manufacturing advantages of uniform tabs are seen to greatest advantage when the labels or tab sets as they are being manufactured on a web medium, are arranged on such medium in a regular array, such as an orthogonal row-and-column array. Just as the preferred geometry involves one or more rows of tabs arrayed along the machine direction of a web of flexible dielectric stock, it is preferred that each set of uniform tabs be circumscribed by a well defined area of the web; most preferably this circumscribing area substantially takes the form of a rectangle.

Likewise, it is preferred that the ground plane or radio frequency reflecting member of the antenna structure or tag be formed in association with the tag itself for better space and manufacturing efficiency using the web manufacturing process. In one method, the ground plane is formed or provided separately from the formation of the tabs on the long flexible web. In this case, the separately produced ground plane must later be associated with and properly positioned when the tag is placed on its desired packaging.

In another method, the ground plane is formed on the same web as the tabs, preferably along the machine direction of the web. The antenna tabs and the ground plane may be separated by a fold line, which may be a scored line on the web, for ease in application of the label to packaging. In this method, the antenna structure of the tag and its associated ground plane elements are formed together in a known and fixed spatial relationship and handled as a single unit for application to the desired packaging. In application, the tag is placed on a side of the packaging along an edge. In this position, the tag can be folded along a score line so that the antenna structure portion of the tag remains on the outside surface panel of the package, while the ground plane portion is positioned on the inside surface of the panel of the package opposite the antenna tabs to provide a radio frequency reflective ground plane. Intermediate the antenna tabs and the ground plane element of the tab is sandwiched the side of the packaging, which may be used by the label as a dielectric between these two label elements for better label operation.

In another embodiment, the tabs are preferably printed on a continuous webbing with a self-adhesive backing. When used, they are detached from the webbing and attached to the packaging in an automated procedure. In a different embodiment, the tabs are reactively coupled to the surface of the package through a dielectric material. Preferred dielectric materials may include an adhesive material placed on the tabs that doubles to attach the tag to a package or alternatively, the material from which the package is constructed as a cardboard layer between the tabs and a grounding or radio frequency reflecting structure commonly referred to as a ground plane.

The antenna structure is designed so that the impedance that the antenna system is not substantially affected by the substrate to which the wireless communication device is attached so that it will remain within a known range of impedance for tag designing purposes. In one embodiment, the antenna arrangement is a dipole antenna formed by identically shaped tabs. The tabs are manufactured with an adhesive on one side so that they may be adhered to the surface of the substrate forming the packaging. The tabs are connected at feedpoints to the wireless communication device with transmission lines that may be conductive paths or wires.

It is also contemplated that the wireless communication device of the RFID tag may be recessed into an indentation formed in the packaging substrate so that the wireless communication device does not protrude from the substrate surface, making the RFID tag less prone to damage during handling of the packaging.

In another embodiment, the invention includes a tag that may be mounted on only one side of the packaging. In this embodiment at least two conductive tabs are arranged to form a dipole antenna. A thin dielectric is coupled to the conductive tabs and a ground plane, or radio frequency reflecting structure, is coupled to the thin dielectric so that the thin dielectric is between the conductive tabs and ground plane. The ground reflecting structure can be unitary, that is, formed from a single connected element such as a flat plate, or formed from a cooperating series of isolated components such as a series of non-connected flat plates.

DETAILED DESCRIPTION OF THE INVENTION

The present invention is directed to a radio frequency identification device (RFID) and its antenna system as it is attached to a package or container to communicate information about the package or container to an external reader. The package may be an individual package containing specific, known contents, or an individual, exterior package containing within it a group of additional, interior individual packages. The word "package" and "container" are used interchangeably herein to describe a material that houses contents, such as goods or other individual packages, and equivalent structures. The present invention should not be limited to any particular meaning or method when either "package" or "container" is used.

Figure 1:
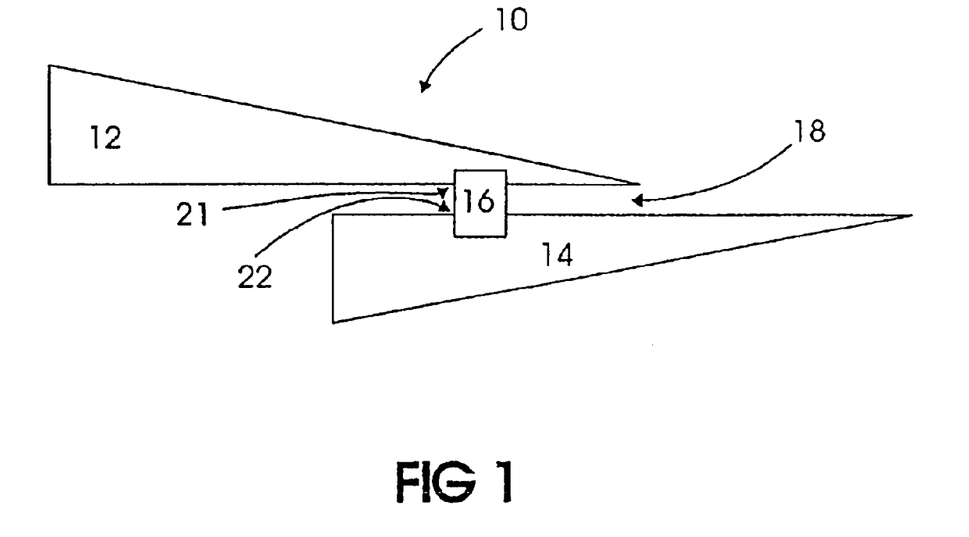
FIG. 1 is a schematic diagram of an RFID tag incorporating an antenna arrangement embodying the present invention.

FIG. 1 illustrates one embodiment of the present invention that is found in an RFID tag 10 that includes a wireless communication device 16. The device 16 may be either active in generating itself the radio frequency energy in response to a received command, or passive in merely reflecting received radio frequency energy back to an external originating source, such as current RFID tag readers known in the art.

In this embodiment, there are preferably at least two conductive tabs 12, 14, coupled to the wireless communication for receiving and radiating radio frequency energy received. These two tabs 12, 14, are substantially identical in shape and are coupled to the wireless communication device 16 at feedpoint that differs in location on each of the tabs. These tabs 12, 14, may be generally identical in conducting area if the two tabs are of the same size as well as shape, but it is also contemplated that the tabs 12, 14, may differ in size while their shape remains generally the same resulting in a different conducting area. The tabs may be collinear or non-collinear to provide different desired antenna structures. For example, in FIG. 1 tabs 12, 14 are offset and adjacent to provide a slot antenna system in area 18 that provides for resonance at multiple radiating frequencies for operation at multiple frequencies.

It is also contemplated that the invention includes having multiple arrays of conductive tabs that are connected to device 16. These tabs may be designed to work in unison with on another to form dipole or Yagi antenna systems, or singly to form monopole antennas as desired for the particular tag application. By using such multiple conductive tab arrays, multiple resonant frequencies may be provided so that the tag may be responsive to a wider range of tag readers and environmental situations than a single dedicated pair of conductive tabs.

Figure 2:
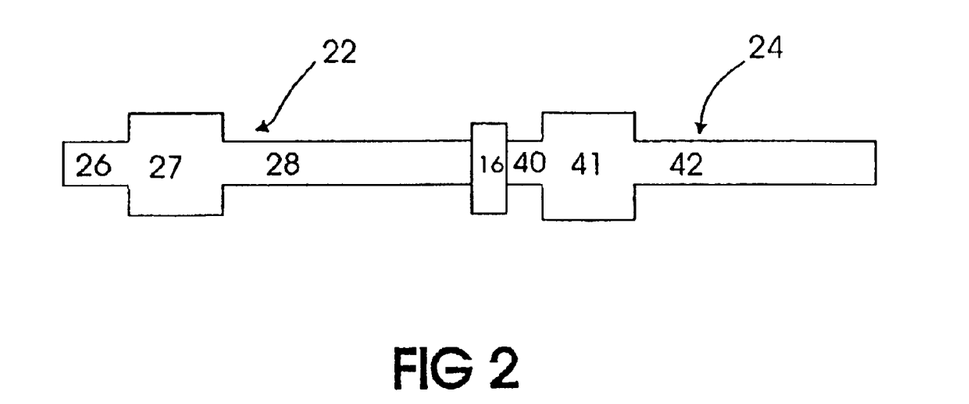
FIG. 2 is a schematic diagram of an RFID tag incorporating an alternative antenna arrangement embodying the present invention.
Figure 3:
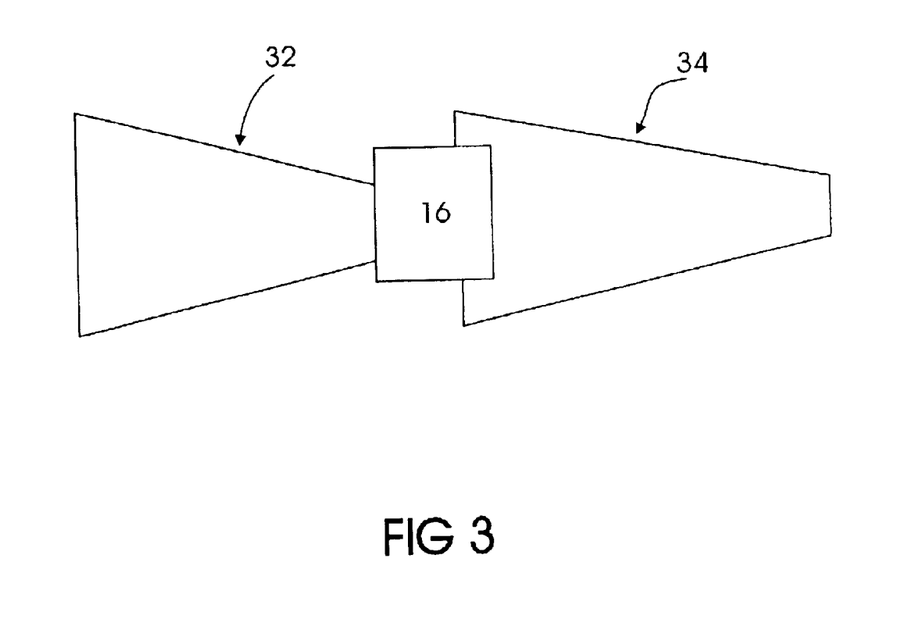
FIG. 3 is a schematic diagram of an RFID tag incorporating a second alternative antenna arrangement embodying the present invention; and, FIG. 4 is a cross sectional view of an RFID tag incorporating an antenna arrangement embodying the present invention as it would be mounted on a packaging sidewall.

Other considered shapes for the conductive tabs are illustrated in FIGS. 2 and 3 and include not only regular shapes such as the tapered, triangular shape illustrated in FIG. 1, but also truncated triangular shapes denoted by reference numbers 32, 24 in FIG. 3.

Rectangular shaped conductive tabs are also included in this invention as illustrated in FIG. 2 as reference numbers 22, 24. In fact, FIG. 2 illustrates, for example, that the tabs may include a series of contiguous rectangular portions 26, 27, 28 and 40, 41, 42.

In one preferred embodiment of the invention, the rectangular portions shown in FIG. 2 will have dimensions substantially as follows: Rectangular portion 26 is about 3 millimeters wide by about 3 millimeters long; contiguous rectangular portion 27 is about 10 millimeters wide by about 107.6 millimeters long; and, rectangular portion 28 is about 3 millimeters wide by 15.4 millimeters long. With these dimensions, it is further preferred that the dielectric substrate have a thickness between the conductive tabs and the ground plane of about 6.2 millimeters for foam. Likewise, the ground plane for this preferred embodiment is about 16 millimeters wide by about 261 millimeters long.

The conductive tabs may also have irregular shapes, or even composite shapes that include both regular and irregular portions. Other alternative antenna systems that embody the present invention include those that have tabs with a triangular portion contiguous with a freeform curve or a regular curve such as a sinusoidal pattern.

In FIG. 1, the tab feedpoints 20, 21, are selected so that the impedance across the two feedpoints 20, 21 of tabs 12, 14, respectively, is a conjugate match of the impedance across the wireless communication device 16 to allow for a maximum transfer of energy therebetween.

In general, a preferable method of selecting feedpoints on the tabs to achieve this conjugate impedance match, is to select points on each tab differing in location where the width profile of each tab, taken along an axis transverse to the longitudinal centerline axis of each tab, differs from one another, that is, that the width of the tabs, taken along the centerline of the tab as you move away from the center of the tag where it connects to the communications device, measured against the length differs between the two tabs. By choosing such points, either by calculation or trial and error, a conjugate impedance match can be achieved.

Specifically, with reference to the Figures, the longitudinal centerline axis of a tab is seen to be a line that remains equidistant from opposite borders or edges of the tab and extending from one end of the tab to the other. At times with regular shaped tabs, this longitudinal centerline axis will be a straight line similar to a longitudinal axis of the tab. At other times, with irregular shaped tabs, the longitudinal centerline axis will curve to remain equidistant from the borders. It is also seen that this longitudinal centerline axis is unique to each tab. The width of the tab is determined along an axis transverse to the longitudinal centerline axis and will be seen to be dependent upon the shape of the tab. For example, with a rectangular shaped tab, the width will not vary along the longitudinal centerline axis, but with a triangular or wedge shaped tab, the width will vary continuously along the longitudinal centerline axis of the tab. Thus, while it is contemplated that the present invention includes tabs having rectangular shaped portions, there will also be portions having different widths.

Another preferred method of selecting the feedpoints on the conductive tabs, is to select a feedpoint differing in location on each of the tabs where the conducting area per unit length of the longitudinal centerline axis of each tab varies with distance along the longitudinal centerline axis of each of said tabs from its feedpoint. In essence, this method selects as a feedpoint a location on each tab where the integrated area of the shape per unit length of the centerline varies and not necessarily the width of the tab.

Figure 4:
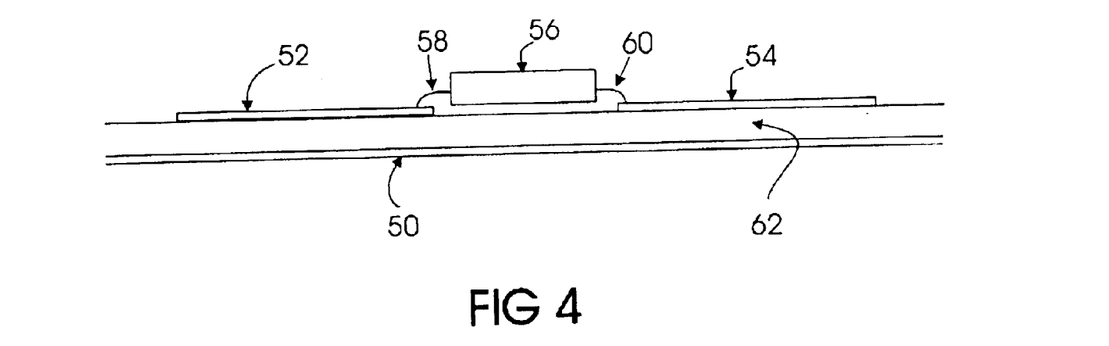

FIG. 4 illustrates how a radio frequency reflecting structure 50 is coupled to the tabs 52, 54, for reflecting radio frequency energy radiated from the tabs. It is preferred that the groundplane elements be substantially same size as the conductive tabs or greater, so that they may effectively reflect radio frequency energy. If the groundplane elements are substantially smaller than the conductive tabs, the radio frequency energy will extend beyond the edges of the groundplane elements and interact with the contents of the packaging causing deterioration in the operating efficiency of the label. In this illustration the wireless communication device 56 is connected at feedpoints 58, 60 to tabs 52, 54. This structure 50 may be a simple groundplane made from a single, unitary plate or a complex reflecting structure that includes several isolated plates that act together to reflect radio frequency energy. If the antenna structure is located on one side of a package wall 62, the radio frequency reflecting structure 50 may be on the opposite side of the same wall 62 using the wall itself as a dielectric material as described further below.

As indicated above, a dielectric material is preferably located intermediate the conductive tabs 52, 54, and the radio frequency reflecting structure 50 such as the packaging wall 62 described above. The thickness or the dielectric characteristic of the dielectric intermediate the tabs and radio frequency reflecting structure may be varied along a longitudinal or transverse axis of the tabs. Generally, it has been found that at UHF frequencies, defined as a band in the range of 860 MHZ to 950 MHZ, a dielectric thickness of about 3 millimeter to 6 millimeters is suitable for a tag embodying the present invention. Likewise, a dielectric thickness of about 0.5 millimeter to about 3 millimeters is suitable for a tag designed to operate in a band centered on 2450 MHZ. This range of thickness has been found to be suitable for efficient operation of the conductive tabs despite the normally believed requirement for a separation distance of a quarter of a wavelength of the operating frequency between the radiating element and groundplane.

Figure 5A:
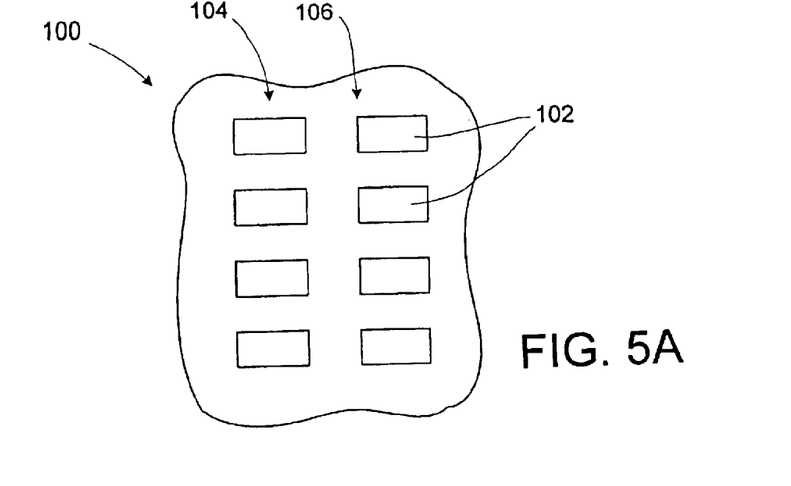
FIG. 5A schematically illustrates a first embodiment of a conductive tab that includes non-conducting areas.
Figures 5B, 5C:
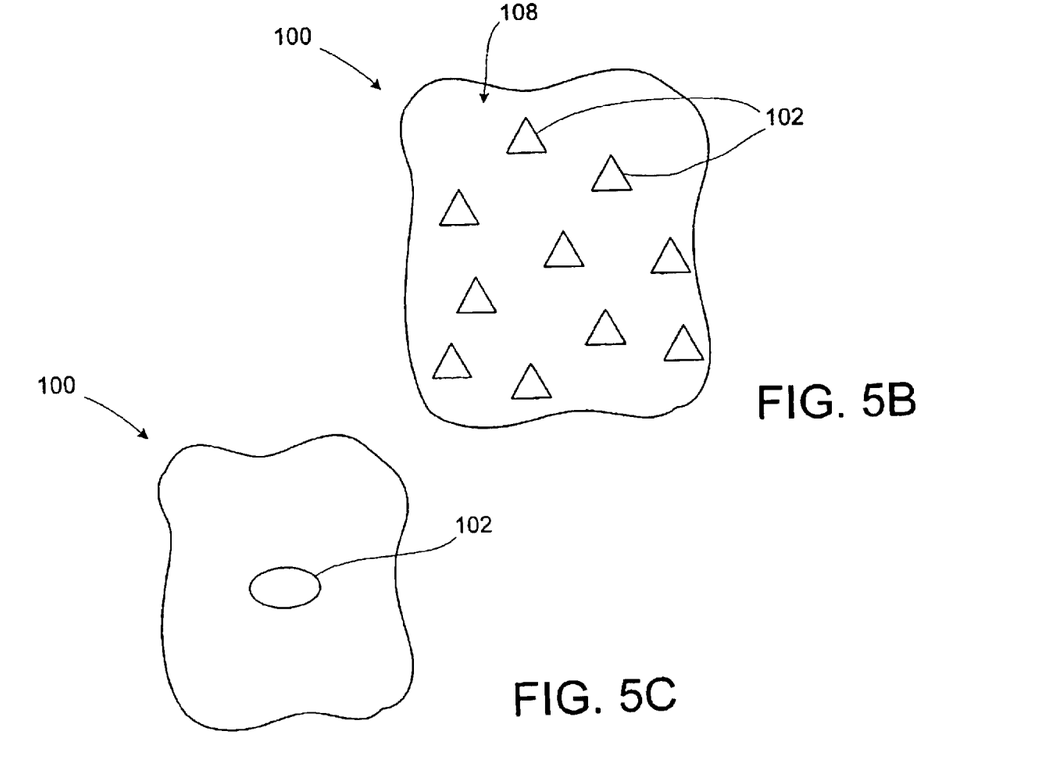
FIG. 5B schematically illustrates a second embodiment of a conductive tab that includes non-conducting areas.
FIG. 5C schematically illustrates a third embodiment of a conductive tab that includes non-conducting areas.

FIGS. 5A–5C show various embodiments of a conductive tab 100, such as those described above, that each include at least one non-conducting area, such as a plurality of non-conducting areas 102. The non-conducting areas 102 may have a substantially rectangular shape, such as is schematically illustrated in FIG. 5A; may have a substantially triangular shape, such as is schematically illustrated in FIG. 5B; or may have a substantially oval shape, such as is schematically illustrated in FIG. 5C. As schematically illustrated in FIG. 5A, the non-conducting areas 102 may form a regular pattern 104, such as a grid 106. Alternatively, the non-conducting areas 102 may form an irregular pattern 108, such as is schematically illustrated in FIG. 5B.

With the present invention advantages have been found in both manufacturing and application of the labels in that a thinner, lower dielectric material may be used in label construction, as well as the fact that shorter tabs may be utilized resulting in a manufacturing savings in using less ink and label materials in constructing each label and in increasing the label density on the web medium during manufacturing making less wasted web medium. Also such thinner and smaller labels are easier to affix to packaging and less likely to be damaged than those thicker labels that protrude outwardly from the packaging surface to which they are attached.

Another embodiment of the present invention is directed toward the antenna structure itself as described above without the wireless communication device.

Certain modifications and improvements will occur to those skilled in the art upon a reading of the foregoing description. It should be understood that the present invention is not limited to any particular type of wireless communication device, tabs, packaging, or slot arrangement. For the purposes of this application, couple, coupled, or coupling is defined as either directly connecting or reactive coupling. Reactive coupling is defined as either capacitive or inductive coupling. One of ordinary skill in the art will recognize that there are different manners in which these elements can provide to accomplish the present invention. The present invention is intended to cover what is claimed and any equivalents. The specific embodiments used herein are to aid in the understanding of the present invention, and should not be used to limit the scope of the invention in a manner narrower than the claims and their equivalents.

What is claimed is:

1. An antenna system for use with a wireless communication device, comprising:
    A plurality of conductive tabs coupled to said wireless communication device for receiving and radiating radio frequency energy, at least two of said plurality of tabs each coupled to said wireless communication device at a feedpoint differing in location on each of said two tabs and wherein the width of said at least two of said plurality of tabs taken transverse to the longitudinal centerline axis of each tab varies with distance along the longitudinal centerline axis of each of said tabs from its feedpoint;
    Radio frequency reflecting means coupled to said plurality of conductive tabs for reflecting radio frequency energy radiated therefrom; and
    A dielectric intermediate said conductive tabs and said radio frequency reflecting means.

2. A device as in claim 1 wherein said at least two of said plurality of tabs are substantially identical in shape.

3. A device as in claim 2 wherein said at least two of said plurality of tabs that are substantially identical in shape are further substantially identical in conducting area.

4. A device as in claim 2 wherein said at least two of said plurality of tabs that are substantially identical in shape differ in conducting area.

5. A device as in claim 2 wherein said at least two of said plurality of tabs each includes at least one non-conducting area.

6. A device as in claim 2 wherein said at least two of said plurality of tabs each includes a plurality of non-conducting areas.

7. A device as in claim 6 wherein said plurality of non-conducting areas form a regular pattern.

8. A device as in claim 6 wherein said regular pattern is a grid.

9. A device as in claim 6 wherein said plurality of non-conducting areas form an irregular pattern.

10. A device as in claim 2 wherein said at least two of said plurality of tabs that are substantially identical in shape, each have a tapered shape.

11. A device as in claim 10 wherein said at least two of said plurality of tabs that are substantially identical in shape, have a substantially triangular shape.

12. A device as in claim 10 wherein said at least two of said plurality of tabs that are substantially identical in shape, have a shape that contains at least two contiguous rectangular portions.

13. A device as in claim 12 wherein said at least two contiguous rectangular portions differ in conducting area from one another.

14. A device as in claim 2 wherein said at least two of said plurality of tabs that are substantially identical in shape are collinear.

15. A device as in claim 2 wherein said at least two of said plurality of tabs that are substantially identical in shape are non-collinear.

16. A device as in claim 1 wherein said radio frequency reflecting means is a continuous ground plane structure.

17. A device as in claim 1 wherein said radio frequency reflecting means is a discontinuous ground plane structure.

18. A device as in claim 1 wherein the thickness of said dielectric intermediate said conductive tabs and said radio frequency reflecting means varies along a longitudinal axis of said conductive tabs.

19. A device as in claim 18 wherein the thickness of said dielectric intermediate said conductive tabs and said radio frequency reflecting means varies from about 0.5 millimeters to about 3.0 millimeters.

20. A device as in claim 1 wherein the dielectric characteristic of said dielectric intermediate said conductive tabs and said radio frequency reflecting means varies along a longitudinal axis of said conductive tabs.

21. A device as in claim 1 wherein the thickness of said dielectric intermediate said conductive tabs and said radio frequency reflecting means varies along a transverse axis of said conductive tabs.

22. device as in claim 21 wherein the thickness of said dielectric intermediate said conductive tabs and said radio frequency reflecting means varies from about 0.5 millimeters to about 3.0 millimeters.

23. A device as in claim 1 wherein the dielectric characteristic of said dielectric intermediate said conductive tabs and said radio frequency reflecting means varies along a transverse axis of said conductive tabs.

24. A device as in claim 1 wherein the width of said at least two of said plurality of tabs taken transverse to the longitudinal centerline axis of each tab varies abwptly with distance along the longitudinal centerline axis of each of said tabs from its feedpoint.

25. The antenna system of claim 1, in combination with the wireless communication device that is coupled to the feedpoints of the tabs.

26. The antenna system of claim 1, wherein the dielectric material is part of a package wall.

27. The antenna system of claim 26, wherein the portion of the package wall includes cardboard.

28. The antenna system of claim 1, wherein the dielectric material includes foam.

29. The antenna system of claim 1, wherein the at least two of the conductive tabs define a space therebetween such that the tabs function as a slot antenna, thereby allowing the antenna system to have multiple resonant frequencies.

30. An antenna system for use with a wireless communication device, comprising:
    A plurality of conductive tabs coupled to said wireless communication device for receiving and radiating radio frequency energy, at least two of said plurality of tabs, each being substantially identical in shape and conducting area, and further including at least one non-conducting area, are each coupled to said wireless communication device at a feedpoint differing in location on each of said two tabs and wherein the width of said at least two of said plurality of tabs taken transverse to the longitudinal centerline axis of each tab varies with distance along the longitudinal centerline axis of each of said tabs from its feed point;
    Radio frequency reflecting means coupled to said plurality of conductive tabs for reflecting radio frequency energy radiated therefrom; and,
    A dielectric intermediate said conductive tabs and said radio frequency reflecting means.

31. A device as in claim 30 wherein said at least two of said plurality of tabs each includes a plurality of non-conducting areas.

32. A device as in claim 31 wherein said non-conducting areas have a substantially rectangular shape.

33. A device as in claim 31 wherein said non-conducting areas have a substantially triangular shape.

34. A device as in claim 31 wherein said non-conducting areas have a substantially oval shape.

35. A device as in claim 30 wherein the thickness of said dielectric intermediate said conductive tabs and said radio frequency reflecting means varies along a longitudinal axis of said conductive tabs.

36. A device as in claim 30 wherein the dielectric characteristic of said dielectric intermediate said conductive tabs and said radio frequency reflecting means varies along a longitudinal axis of said conductive tabs.

37. A device as in claim 30 wherein the thickness of said dielectric intermediate said conductive tabs and said radio frequency reflecting means varies along a transverse axis of said conductive tabs.

38. A device as in claim 30 wherein the dielectric characteristic of said dielectric intermediate said conductive tabs and said radio frequency reflecting means varies along a transverse axis of said conductive tabs.

39. A device as in claim 30 wherein said at least two of said plurality of tabs that are substantially identical in shape are collinear.

40. A device as in claim 30 wherein said at least two of said plurality of tabs that are substantially identical in shape are non-collinear.

41. The antenna system of claim 30, in combination with the wireless communication device that is coupled to the feedpoints of the tabs.

42. The antenna system of claim 30, wherein at least part of the dielectric material is a portion of a package wall.

43. The antenna system of claim 42, wherein the portion of the package wall includes cardboard.

44. The antenna system of claim 30, wherein the dielectric material includes foam.

45. The antenna system of claim 30, wherein the at least two of the conductive tabs define a space therebetween such that the tabs function as a slot antenna, thereby allowing the antenna system to have multiple resonant frequencies.

46. An antenna system for use with a wireless communication device, comprising:
   A plurality of conductive tabs coupled to said wireless communication device for receiving and radiating radio frequency energy, at least two of said plurality of tabs each coupled to said wireless communication device at a feedpoint differing in location on each of said two tabs and wherein the conducting area per unit length of the longitudinal centerline axis of each tab varies with distance along the longitudinal centerline axis of each of said tabs from its feedpoint;
   Radio frequency reflecting means coupled to said plurality of conductive tabs for reflecting radio frequency energy radiated therefrom; and,
   A dielectric intermediate said conductive tabs and said radio frequency reflecting means.

47. A device as in claim 46 wherein said at least two of said plurality of tabs each includes a plurality of non-conducting areas.

48. A device as in claim 47 wherein said non-conducting areas have a substantially rectangular shape.

49. A device as in claim 47 wherein said non-conducting areas have a substantially triangular shape.

50. A device as in claim 47 wherein said non-conducting areas have a substantially oval shape.

51. A device as in claim 46 wherein the thickness of said dielectric intermediate said conductive tabs and said radio frequency reflecting means varies along a longitudinal axis of said conductive tabs.

52. A device as in claim 46 wherein the dielectric characteristic of said dielectric intermediate said conductive tabs and said radio frequency reflecting means varies along a longitudinal axis of said conductive tabs.

53. abruptly as in claim 46 wherein the thickness of said dielectric intermediate said conductive tabs and said radio frequency reflecting means varies along a transverse axis of said conductive tabs.

54. A device as in claim 46 wherein the dielectric characteristic of said dielectric intermediate said conductive tabs and said radio frequency reflecting means varies along a transverse axis of said conductive tabs.

55. A device as in claim 46 wherein said at least two of said plurality of tabs that are substantially identical in shape are collinear.

56. A device as in claim 46 wherein said at least two of said plurality of tabs that are substantially identical in shape are non-collinear.

57. The antenna system of claim 46, in combination with the wireless communication device that is coupled to the feedpoints of the tabs.

58. The antenna system of claim 46, wherein the dielectric material is part of a package wall.

59. The antenna system of claim 58, wherein the portion of the package wall includes cardboard.

60. The antenna system of claim 46, wherein the dielectric material includes foam.

61. The antenna system of claim 46, wherein the at least two of the conductive tabs define a space therebetween such that the tabs function as a slot antenna, thereby allowing the antenna system to have multiple resonant frequencies.

62. A radio frequency identification (RFID) device that includes
   a wireless communication device;
   a pair of conductive tabs coupled to the wireless communication device at respective feedpoints;
   planar conductive material operatively coupled to the conductive tabs to reflect radio energy from the tabs; and
   a dielectric material between the conductive tabs and the planar conductive material;
   wherein width profiles of the tabs vary with distance from one another, wherein the width profiles are taken beginning at the feedpoints in directions away from the wireless communication device, and are taken transverse to respective longitudinal centerline axes of the tabs.

63. The device of claim 62, wherein the tabs are substantially identical in shape.

64. The device of claim 63, wherein the tabs are substantially identical in conducting area.

65. The device of claim 64, wherein the tabs are anti-symmetric about a line midway between the tabs.

66. The device of claim 63, wherein the tabs differ in conducting area.

67. The device of claim 63, wherein at least part of the tabs are tapered in shape.

68. The device of claim 67, wherein the tabs each are substantially triangular in shape.

69. The device of claim 67, wherein the tabs each have a truncated triangular shape.

70. The device of claim 62, wherein at least part of the tabs are rectangular in shape.

71. The device of claim 70, wherein each of the tabs has multiple rectangular portions with different widths.

72. The device of claim 62, wherein tab widths at the feedpoints are substantially the same for both tabs.

73. The device of claim 62, wherein tab widths at the feedpoints are different for each of the tabs.

74. The device of claim 62, wherein the planar conductive material is continuous.

75. The device of claim 62, wherein the planar conductive material is discontinuous.

76. The device of claim 62, wherein thickness of the dielectric intermediate varies along a longitudinal axis of said conductive tabs.

77. The device of claim 76, wherein the thickness of the dielectric varies from about 0.5 millimeters to about 3.0 millimeters.

78. The device of claim 62, wherein the dielectric characteristic of the dielectric varies along a longitudinal axis of said conductive tabs.

79. The device of claim 62, wherein the thickness of the dielectric varies along a transverse axis of said conductive tabs.

80. The device of claim 79, wherein the thickness of the dielectric varies from about 0.5 millimeters to about 3.0 millimeters.

81. The device of claim 62, wherein the dielectric characteristic of the dielectric varies along a transverse axis of said conductive tabs.

82. The device of claim 62, wherein the longitudinal axes of the tabs are collinear.

83. The device of claim 62, wherein the longitudinal axes of the tabs are non-collinear.

84. The device of claim 62, wherein the width profile of at least one of the tabs is continuous.

85. The device of claim 62, wherein the width profile of at least one of the tabs is discontinuous.

86. The device of claim 62, wherein the dielectric material is part of a package wall.

87. The device of claim 86, wherein the portion of the package wall includes cardboard.

88. The device of claim 62, wherein the dielectric material includes foam.

89. The device of claim 62, wherein the at least two of the conductive tabs define a space therebetween such that the tabs function as a slot antenna, thereby allowing the antenna system to have multiple resonant frequencies.

* * * * *